United States Patent
Mu (10) Patent No.: US 11,902,945 B2
(45) Date of Patent: Feb. 13, 2024

(54) METHOD, DEVICE, AND SYSTEM FOR TRANSMITTING DATA IN DIVIDED TRANSMISSION BLOCKS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 472 days.

(21) Appl. No.: 17/276,381

(22) PCT Filed: Sep. 14, 2018

(86) PCT No.: PCT/CN2018/105669
§ 371 (c)(1),
(2) Date: Mar. 15, 2021

(87) PCT Pub. No.: WO2020/051867
PCT Pub. Date: Mar. 19, 2020

(65) Prior Publication Data
US 2022/0030590 A1    Jan. 27, 2022

(51) Int. Cl.
*H04W 72/0446* (2023.01)

(52) U.S. Cl.
CPC ............... *H04W 72/0446* (2013.01)

(58) Field of Classification Search
CPC ... H04W 72/0446; H04W 4/70; H04W 28/04; H04W 72/1263; Y02D 30/70; H04L 1/08; H04L 1/189; H04L 1/1893
See application file for complete search history.

(56) References Cited

U.S. PATENT DOCUMENTS

| 2004/0240454 | A1  | 12/2004 | Yamauchi et al. |
| 2008/0186935 | A1* | 8/2008  | Ling ............... H04L 5/0041 370/342 |
| 2014/0029561 | A1  | 1/2014  | Kim et al. |
| 2017/0265193 | A1* | 9/2017  | Wang ............... H04W 72/0453 |

(Continued)

FOREIGN PATENT DOCUMENTS

| CN | 1571513   A | 1/2005 |
| CN | 102857319 A | 1/2013 |

(Continued)

OTHER PUBLICATIONS

"SC-MTCH Transmission Reliability", 3GPP TSG-RAN WG2 Meeting #96, R2-167685, Reno, USA, Nov. 14-18, 2016.

(Continued)

*Primary Examiner* — Afshawn M Towfighi
(74) *Attorney, Agent, or Firm* — Cooper Legal Group, LLC (57) ABSTRACT

The present application relates to the technical field of communications, and provided thereby are a data transmission method, device, equipment and system and a storage medium. The method comprises: generating m transmission blocks (TB) according to data to be transmitted, each TB comprising partial data from within the data, and m≥2; dividing transmission content related to each TB into n transmission units within time domain, wherein n≥2; and transmitting the n transmission units related to each TB alternately to a receiving terminal in the time domain, the transmission of the n transmission units in the time domain being non-continuous.

24 Claims, 6 Drawing Sheets

(56) References Cited

U.S. PATENT DOCUMENTS

| | | | | |
|---|---|---|---|---|
| 2017/0279472 A1* | 9/2017 | Wong | ................... | H04L 67/12 |
| 2019/0313442 A1* | 10/2019 | Hosseini | ........... | H04W 72/0473 |
| 2020/0022149 A1* | 1/2020 | Beale | ................... | H04W 72/53 |
| 2021/0153082 A1* | 5/2021 | Axmon | ................ | H04W 48/16 |
| 2022/0030590 A1* | 1/2022 | Mu | ................... | H04W 72/0446 |

FOREIGN PATENT DOCUMENTS

| | | |
|---|---|---|
| CN | 101325573 B | 8/2013 |
| CN | 103354537 A | 10/2013 |
| CN | 107889067 A | 4/2018 |
| CN | 108390747 A | 8/2018 |
| JP | 2007525102 A | 8/2007 |
| RU | 2539585 C2 | 3/2014 |

OTHER PUBLICATIONS

"Multiple TB Grant Design for Unicast", 3GPP TSG RAN WG1 Meeting 94, R1-1808355, Gothenburg, Sweden, Aug. 20-Aug. 24, 2018.
Supplementary European Search Report as cited in EP18933526.8 dated Mar. 18, 2022, 6 pages.
Corresponding Japanese Patent Application No. 2021-514326, Office Action dated Jun. 7, 2022. English Translation.
International Search Report and English Translation as cited in PCT Application No. PCT/CN2018/105669 dated May 28, 2019, 6 pages.
Written Opinion as cited in PCT Application No. PCT/CN2018/105669 dated May 28, 2019, 4 pages.
Corresponding Russian Patent Application No. 202110932807, Office Action dated Sep. 17, 2021. English Translation.

* cited by examiner

METHOD, DEVICE, AND SYSTEM FOR TRANSMITTING DATA IN DIVIDED TRANSMISSION BLOCKS

CROSS-REFERENCE TO RELATED APPLICATION

This application is a U.S. national phase of International Application No. PCT/CN2018/105669, filed with the State Intellectual Property Office of P. R. China on Sep. 14, 2018.

TECHNICAL FIELD

The present disclosure relates to a field of communication technology, and more particularly to a method, an apparatus, a device and a system for transmitting data and storage medium.

BACKGROUND

MTC (Machine Type Communication) and NB-IoT (Narrow Band Internet of Thing) are classic representatives of the cellular IoT technology, which are widely used.

Terminals in MTC and NB-IoT need to perform blind test on a PDCCH (Physical Downlink Control Channel) and schedule one PDSCH (Physical Downlink Shared Channel) or one PUSCH (Physical Uplink Shared Channel) through one PDCCH. Since one PDSCH carries one downlink TB (Transmission Block) and one PUSCH carries one uplink TB, it can be understood that one uplink TB and one downlink TB are scheduled through one PDCCH. When at least two TBs are generated based on data to be transmitted, since one PDCCH is used to schedule one TB, even though channel statuses for transmitting these TBs are similar and the scheduled PDCCHs have similar content, the terminal still needs to demodulate each scheduled PDCCH, which consumes power of the terminal.

In order to save power consumption, an access device may continuously schedule multiple uplink TBs or multiple downlink TBs. In other words, when at least two TBs are generated based on the data to be transmitted, the at least two TBs are transmitted sequentially. Since the channel status is of instability, if the channel status is unstable when a certain TB is intensively transmitted, then all the data in the TB cannot be received correctly, thus affecting accuracy of data transmission.

SUMMARY

In order to solve the problem in the related art, a method, an apparatus, a device and a system for transmitting data and storage medium are provided in the present disclosure.

According to a first aspect of embodiments of the present disclosure, a method for transmitting data is provided. The method is applicable in a transmitting end, and includes generating m transmission blocks, TBs, based on data to be transmitted, in which each TB includes partial data of the data to be transmitted, where $m \geq 2$; dividing related transmission content of each TB into n transmission units in time domain, where $n \geq 2$; and transmitting the n transmission units related to each TB to a receiving end alternately in time domain, in which the n transmission units are non-continuously transmitted in the time domain.

According to a second aspect of embodiments of the present disclosure, a method for transmitting data is provided. The method is applicable in a receiving end, and includes receiving n transmission units related to each TB alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where $m \geq 2$ and $n \geq 2$; and combining the n transmission units related to each TB to obtain the data to be transmitted.

According to a third aspect of embodiments of the present disclosure, an apparatus for transmitting data is provided. The apparatus is applicable in a transmitting end, and includes a generating module, a dividing module and a transmitting module. The generating module is configured to generate m transmission blocks, TBs, based on data to be transmitted, in which each TB includes partial data of the data to be transmitted, where $m \geq 2$. The dividing module is configured to divide related transmission content of each TB into n transmission units in time domain, where $n \geq 2$. The transmitting module is configured to transmit the n transmission units related to each TB to a receiving end alternately in time domain, in which the n transmission units are non-continuously transmitted in the time domain.

According to a fourth aspect of embodiments of the present disclosure, an apparatus for transmitting data is provided. The apparatus is applicable in a receiving end, and includes a receiving module and a combining module. The receiving module is configured to receive n transmission units related to each TB alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where $m \geq 2$ and $n \geq 2$. The combining module is configured to combine the n transmission units related to each TB to obtain the data to be transmitted.

According to a fifth aspect of embodiments of the present disclosure, a transmitting end is provided. The transmitting end includes a processor and memory configured to store instructions executable by the processor. The processor is configured to generate m transmission blocks, TBs, based on data to be transmitted, in which each TB includes partial data of the data to be transmitted, where $m \geq 2$; divide related transmission content of each TB into n transmission units in time domain, where $n \geq 2$; and transmit the n transmission units related to each TB to a receiving end alternately in time domain, in which the n transmission units are non-continuously transmitted in the time domain.

According to a sixth aspect of the present disclosure, a receiving end is provided. The receiving end includes a processor and memory configured to store instructions executable by the processor. The processor is configured to receive n transmission units related to each TB alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where $m \geq 2$ and $n \geq 2$; and combine the n transmission units related to each TB to obtain the data to be transmitted.

According to a seventh aspect of embodiments of the present disclosure, a data transmission system is provided. The system includes the apparatus for transmitting data according to the third aspect and the apparatus for transmitting data according to the fourth aspect. Or, the system includes the transmitting end according to the fifth aspect and the receiving end according to the sixth aspect.

According to an eighth aspect of embodiments of the present disclosure, computer-readable storage medium is provided. The computer-readable storage medium has at least one instruction, at least one program, at least one set of codes or set of instructions stored therein. The at least one instruction, the at least one program, the at least one set of codes or set of instructions are loaded and executed by a processor to implement the method for transmitting data according to the first aspect. Or, the at least one instruction, the at least one program, the at least one set of codes or set of instructions are loaded and executed by a processor to implement the method for transmitting data according to the second aspect.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

DETAILED DESCRIPTION

Reference will be made in detail to embodiments of the present disclosure. Throughout the descriptions with reference to the accompanying drawings, unless specified or limited otherwise, the same or similar elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

MTC and NB-IoT are mostly used in a scene of collecting data, such as a scene of meter reading in a smart city field, a scene of collecting temperature and humidity information in a smart agriculture field, a scene of sharing bikes in a smart transportation field, and so on. In the release 13 of LTE (Long Term Evolution), a basic framework of the MTC and NB-IoT is formed. Similar to the scheduling in LTE, one MPDCCH (MTC Physical Downlink Control Channel) in the MTC schedules one MPDSCH (MTC Physical Downlink Shared Channel) or one MPUSCH (MTC Physical Uplink Shared Channel), and one NBPDCCH (NB-IoT Physical Downlink Control Channel) in the NB-IoT schedules one NBPDSCH (NB-IoT Physical Downlink Shared Channel) or one NBPUSCH (NB-IoT Physical Uplink Shared Channel). That is, one MPDCCH schedules one uplink TB or one downlink TB, and one NBPDCCH schedules one uplink TB or one downlink TB.

Figure 1:
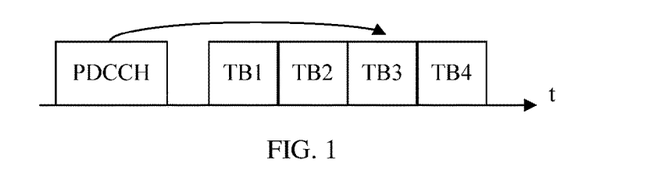
FIG. 1 is a schematic diagram illustrating one PDCCH continuously scheduling four TBs.

Since the MTC and NB-IoT are mostly disposed at places such as wilds and basements where charging is uneasy to perform or a battery is uneasy to replace, in order to save power consumption of the MTC and NB-IoT and to improve endurance capacity of the MTC and NB-IoT, it is proposed in the release 16 of 3GPP ($3^{rd}$ Generation Partnership Project) that one MPDCCH may continuously schedule one multiple uplink TBs or multiple downlink TBs, and one NBPDCCH may continuously schedule one multiple uplink TBs or multiple downlink TBs. Referring to FIG. 1, a schematic diagram of one PDCCH continuously scheduling four TBs is shown. The PDCCH may be an MPDCCH or an NBPDCCH, and the four TBs may be four uplink TBs or four downlink TBs.

Figure 2:
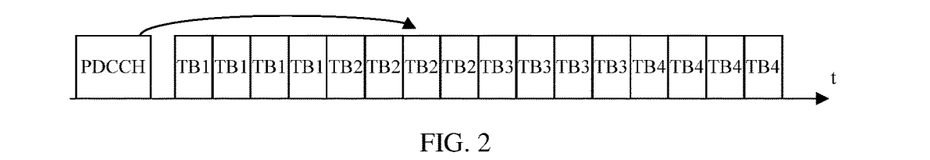
FIG. 2 is a schematic diagram illustrating one PDCCH continuously scheduling four TBs which are repeatedly transmitted for four times.

Since the MTC and NB-IoT have low requirements on communication capability and thus low requirements on processing capability, the processing capability of the MTC and the processing capability of the NB-IoT can be reduced to decrease the cost of the MTC and NB-IoT. On one hand, the MTC and NB-IoT have reduced processing capability; on the other hand, the places such as wilds and basements have poor signal coverage, thus in order to realize coverage enhancement, a repeated transmission mechanism is introduced in the MTC and NB-IoT, such that the same data is repeatedly transmitted in time dimension to realize an effect of cumulative power. Referring to FIG. 2, a schematic diagram of one PDCCH continuously scheduling four TBs for which the number of repeated transmissions reaches to four is shown. The PDCCH may be an MPDCCH or an NBPDCCH, and the four TBs may be four uplink TBs or four downlink TBs. It should be noted that, the number of repeated transmissions in this embodiment refers to a total number of data transmissions. As illustrated in FIG. 2, if the total number of transmissions for the four TBs is four, then the number of repeated transmissions is four.

Regardless of whether the repeated transmission is performed, a transmitting end transmits each TB intensively in the time domain. Since the channel status is of instability, if the channel status is unstable when a certain TB is intensively transmitted, then all the data in the TB cannot be received correctly, thus affecting accuracy of data transmission.

In the embodiment, the transmitting end firstly divides related transmission content of each TB into n transmission units, and then alternately transmits the n transmission units related to each TB, so as to transmit the n transmission units non-continuously in the time domain. In this way, for the n transmission units related to one TB, even though the channel status is poor when some transmission units are transmitted, only these transmission units which are transmitted at this time are affected while other transmission units which are transmitted at other times are not affected, such that the problem that all the data in the TB cannot be received correctly because the channel status is unstable when the n transmission units are intensively transmitted can be avoided, thus improving accuracy of data transmission.

Figure 3:
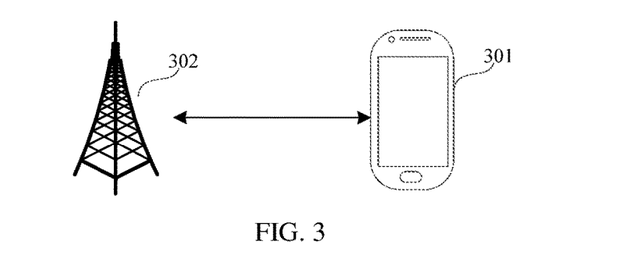
FIG. 3 is a schematic diagram illustrating a mobile communication system involved in various embodiments.

FIG. 3 is a schematic diagram illustrating a mobile communication system involved in various embodiments. The mobile communication system may be a 5G system, also called as NR (New Radio) system. The mobile communication system includes a transmitting end 301 and a receiving end 302. When the transmitting end 301 is a terminal, the receiving end 302 is an access network device. When the transmitting end 301 is an access network device, the receiving end 302 is a terminal.

The access network device may be a base station. For example, the base station may a next generation node base station (gNB) which adopts a centralized-distributed architecture in the 5G system. When the access network device adopts the centralized-distributed architecture, the access network device typically includes a central unit (CU) and at least two distributed units (Dus). The central unit is provided with a protocol stack including a packet data convergence protocol (PDCD) layer, a radio link control (RLC) layer, and a media access control (MAC) layer. The distributed unit is provided with a protocol stack including a physical (PHY) layer. A detailed implementation of the access network device is not limited in the embodiments of the present disclosure. Alternatively, the access network device may further include a home evolved node base station (HeNB), a relay, a Pico base station and so on.

A wireless connection can be established between the access network device and the terminal via a wireless radio. Alternatively, the wireless radio is a wireless radio based on a 5G standard, for example, the wireless radio is the new radio. Or the wireless radio may also be a wireless radio based on a next generation mobile communication network technology standard of the 5G.

The terminal may be a device providing speech and/or data connectivity to a user. The terminal may communicate with one or more core networks via a radio access network (RAN).

The terminal may be a mobile terminal, such as a mobile phone (or referred as "cellular" phone), and a computer having the mobile terminal, for example, a portable, pocket, handheld, computer built-in or vehicle-mounted mobile device, such as subscriber unit, subscriber station, mobile station, mobile, remote station, access point, remote terminal, access terminal, user terminal, user agent, user device, or user equipment.

It should be noted that in the mobile communication system shown in FIG. 3, there may be multiple transmitting ends 301 and/or multiple receiving ends 302. In FIG. 3, one transmitting end 301, which is a terminal, and one receiving end 302, which is a base station, are shown as an example, but the embodiments are not limited to this.

Figure 4:
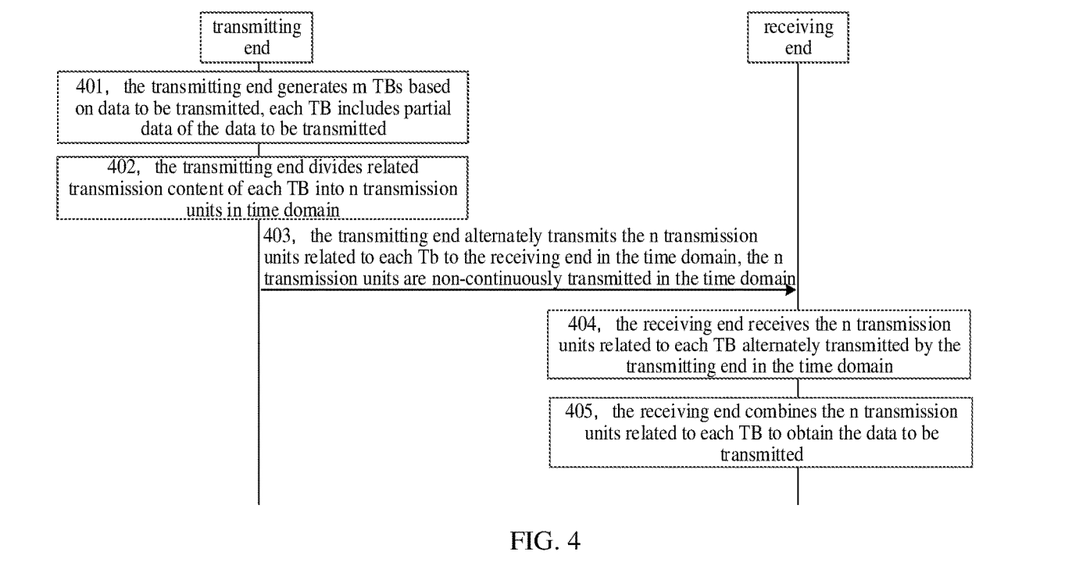
FIG. 4 is a flowchart illustrating a method for transmitting data according to an example embodiment.

FIG. 4 is a flowchart illustrating a method for transmitting data according to an example embodiment. The method is applied to the mobile communication system shown in FIG. 3. As illustrated in FIG. 4, the method includes the following.

At block 401, the transmitting end generates m TBs based on data to be transmitted. Each TB includes partial data of the data to be transmitted, where m>=2.

At block 402, the transmitting end divides related transmission content of each TB into n transmission units in time domain, where n>=2.

In the embodiment, assume that the number of repeated transmissions for the TB is j. When j=1, the related transmission content of the TB is the TB. When j>=2, the related transmission content of the TB is j repeated transmissions of the TB, i.e., j TBs.

At block 403, the transmitting end alternately transmits the n transmission units related to each Tb to the receiving end in the time domain. The n transmission units are non-continuously transmitted in the time domain.

At block 404, the receiving end receives the n transmission units related to each TB alternately transmitted by the transmitting end in the time domain.

At block 405, the receiving end combines the n transmission units related to each TB to obtain the data to be transmitted.

Steps at blocks 401-403 can be separately implemented as an embodiment at the transmitting end, and steps at blocks 404-405 can be separately implemented as an embodiment at the receiving end.

In conclusion, with the method for transmitting data according to the present disclosure, the related transmission content of each TB is divided into n transmission units, and the n transmission units related to each TB are transmitted alternately, so as to transmit the n transmission units non-continuously in the time domain. In this way, for the n transmission units related to one TB, even though the channel status is poor when some transmission units are transmitted, only these transmission units which are transmitted at this time are affected while other transmission units which are transmitted at other times are not affected, such that the problem that all the data in the TB cannot be received correctly because the channel status is unstable when the n transmission units are intensively transmitted can be avoided, thus improving accuracy of data transmission.

Figure 5:
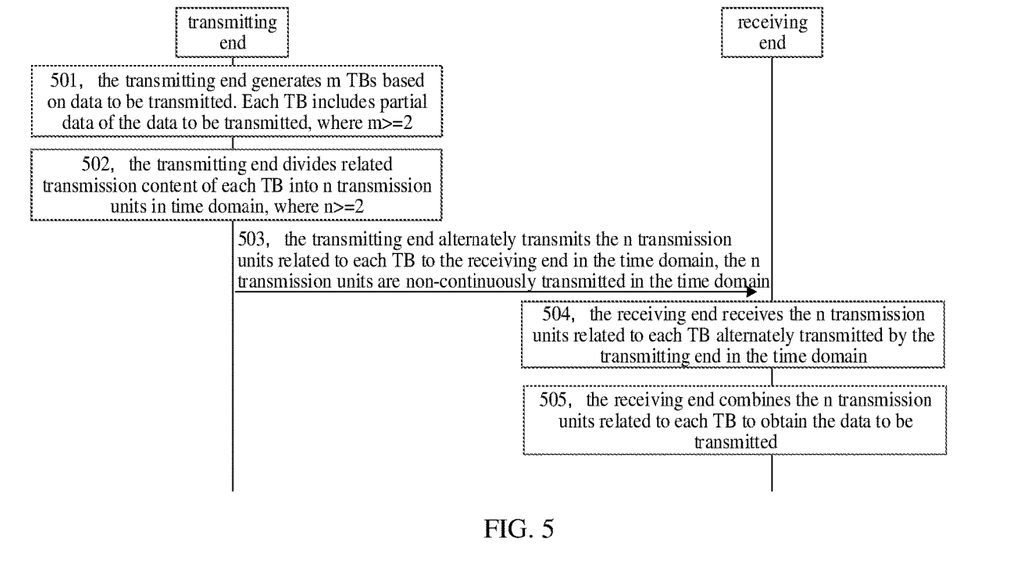
FIG. 5 is a flowchart illustrating a method for transmitting data according to an example embodiment.

FIG. 5 is a flowchart illustrating a method for transmitting data according to an example embodiment. The method is applied to the mobile communication system shown in FIG. 3. As illustrated in FIG. 5, the method includes the following.

At block 501, the transmitting end generates m TBs based on data to be transmitted. Each TB includes partial data of the data to be transmitted, where m>=2.

The data to be transmitted may be any data that can be transmitted through multiple TBs scheduled by one PDCCH. For example, when the embodiment is applied in a meter reading scene, the data to be transmitted may be data obtained by meter reading, or may be parameters for controlling the meter reading or the like. When the embodiment is applied in a scene of collecting temperature and humidity information, the data to be transmitted may be the collected temperature data and humidity data, or may be parameters for controlling temperature and humidity or the like.

The transmitting end may generate the m TBs in many ways, where m>=2. One possible implementation way will be described below as an example.

When the transmitting end is an access network device, the access network device splits the data to be transmitted into m TBs based on data amount of the data and a predefined rule, so as to ensure that each TB includes partial data of the data to be transmitted. When the transmitting end is a terminal, the terminal reports to the access network device data amount of the data to be transmitted, and the access network device instructs the terminal to split the data into m TBs based on the data amount and a predefined rule. The terminal splits the data into the m TBs based on the instruction, to make each TB include partial data of the data to be transmitted.

At block 502, the transmitting end divides related transmission content of each TB into n transmission units in time domain, where n>=2.

Assume that the number of repeated transmissions for the TB is j. When j=1, the related transmission content of the TB is the TB. When j>=2, the related transmission content of the TB is j repeated transmissions of the TB, i.e., j TBs. The related transmission content of each TB is divided into n transmission units as follows, where n>=2.

(I) when j=1, the TB can be divided into at least two sub-TBs, and at least one sub-TB is considered as one transmission unit.

Figure 6:
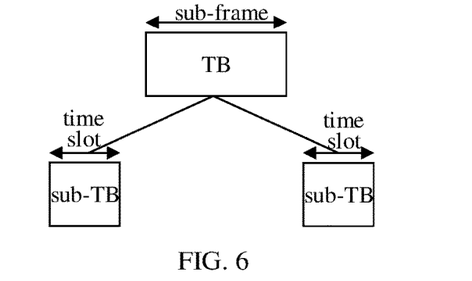
FIG. 6 is a schematic diagram illustrating a division of transmission units according to an example embodiment.

When the TB is divided into sub-TBs, a time granularity of the division may be OFDM (Orthogonal Frequency Division Multiplexing) symbol, time slot, sub-frame or the like. For example, in the MTC, one TB occupies one sub-frame. The TB can be divided into two sub-TBs according to the time slot, and each sub-TB occupies one time slot, as illustrated in FIG. 6. In the NB-IoT, one TB occupies several sub-frames. The TB can be divided into multiple sub-TBs according to the sub-frame, and each sub-TB occupies one or more sub-frames.

After determining the time granularity, the transmitting end may determine the transmission unit in three ways, which will be described below respectively.

In the first determination way, the transmission unit can be predefined in the transmitting end. In other words, in first information in the transmitting end, the transmission unit is predefined. The transmitting end may determine the transmission unit by reading the first information directly. The first information may be a communication protocol, or may be other information, which is not limited herein. The transmitting end mentioned here may be the terminal, or may be the access network device.

In the second determination way, the transmission unit may be obtained by calculating according to a predetermined first rule, i.e., the transmitting end is predefined with a first rule, and the transmitting end may calculate the transmission unit according to the predefined first rule. The first rule may be predefined in a communication protocol, and then the transmitting end may be the terminal or may be the access network device. Or, the first rule may be predefined in the access network device; when the transmitting end is the access network device, the transmitting end may directly determine the transmission unit, and when the transmitting end is the terminal, the access network device may transmit the first rule to the terminal such that the terminal determines the transmission unit.

In the embodiment, the first rule may define determining the transmission unit based on the time granularity corresponding to the TB, determining the transmission unit based on the number of sub-frames occupied by the TB, and so on.

In an example, in the NB-IoT, the transmission unit is determined based on the number of sub-frames occupied by the TB. A first threshold can be predefined; when the number of the sub-frames occupied by the TB is less than or equal to the first threshold, it is determined that each transmission unit occupies one sub-frame, and when the number of the sub-frames occupied by the TB is greater than the first threshold, it is determined that each transmission unit occupies two sub-frames.

In the third determination way, when the transmitting end is the terminal, the access network device may determine the transmission unit in the above two determination ways, and transmits a first signaling to the terminal. The terminal determines the transmission unit according to the first signaling. The first signaling may be a physical layer signaling or a higher layer signaling. The higher layer signaling refers to a signaling of a layer higher than the physical layer.

In the embodiment, when each TB is divided into i sub-TBs, the transmission unit includes one sub-TB, where i>=2. In this case, i=n.

(II) when j>=2, each TB may be divided into sub-TBs, and the sub-TB or a set of sub-TBs may be considered as one transmission unit. Or, each TB may be considered as one transmission unit, or a set of TBs can be considered as one transmission unit. The four conditions will be described below.

It should be noted that it can be defined that the transmission unit is determined based on the number of repeated transmissions. For example, a second threshold and a third threshold may be predefined. When the number of repeated transmissions is less than or equal to the second threshold, it is determined that the transmission unit includes one sub-TB, and one transmission unit occupies one time slot. When the number of repeated transmissions is greater than the second threshold and less than or equal to the third threshold, it is determined that the transmission unit includes one TB. When the number of repeated transmissions is greater than the third threshold, it is determined that the transmission unit includes a set of TBs.

1) when each TB is divided into i sub-TBs, each transmission unit includes one sub-TB, where i>=2.

With regard to the process of dividing the TB into the sub-TBs, reference can be made to the above description, which is not repeated here.

It should be noted that since the number of repeated transmissions for the TB is j and each TB is divided into i sub-TBs, n=i×j.

Figure 7:
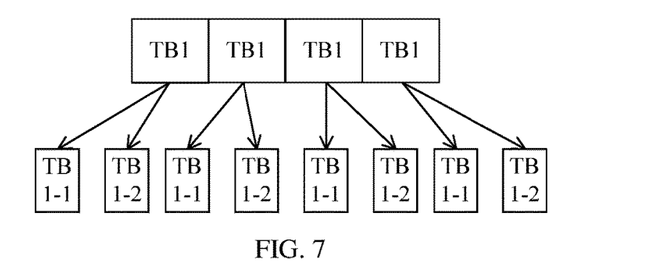
FIG. 7 is a schematic diagram illustrating a division of transmission units according to an example embodiment.

Referring to FIG. 7, take j=4, i=2, and TB1, which is divided into TB1-1 and TB1-2, as an example. In FIG. 7, each TB1-1 is considered as one transmission unit, and each TB1-2 is considered as one transmission unit.

2) when each TB is divided into i sub-TBs and the number of repeated transmissions for each TB is j, the transmission unit includes a set of sub-TBs, and the set of sub-TBs includes k repetitions of the same sub-TB, where i>=2, j>=2 and 2<=k<=j. With regard to the process of dividing the TB into the sub-TBs, reference can be made to the above description, which is not repeated here.

It should be noted that since the number of repeated transmissions for the TB is j, each TB is divided into i sub-TBs and each set of sub-TBs includes k sub-TBs, $n=i\times(j/k)$.

Figure 8:
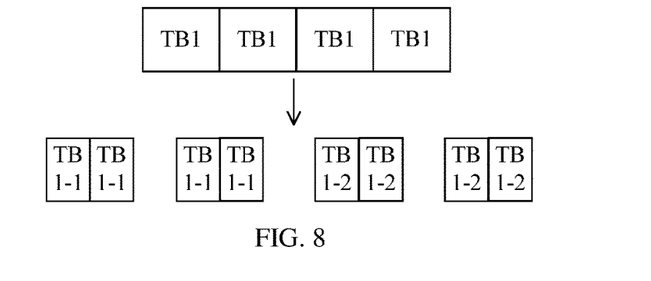
FIG. 8 is a schematic diagram illustrating a division of transmission units according to an example embodiment.

Referring to FIG. 8, take j=4, i=2, k=2, and TB1, which is divided into TB1-1 and TB1-2, as an example. In FIG. 8, each two TB1-1s are considered as one transmission unit, and each two TB1-2s are considered as one transmission unit. Or, when k=4, each four TB1-1s are considered as one transmission unit, and each four TB1-2s are considered as one transmission unit (not shown in FIG. 8).

3) when the number of repeated transmissions for each TB is j, the transmission unit includes one TB, where $j>=2$.

It should be noted that since the number of repeated transmissions for the TB is j, n=j.

Figure 9:
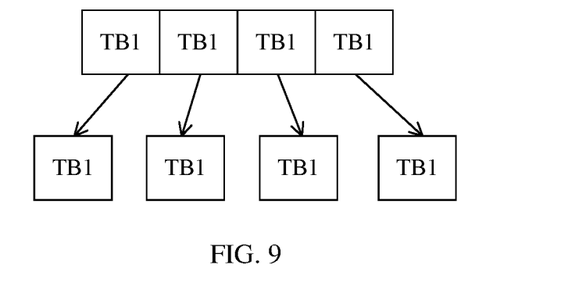
FIG. 9 is a schematic diagram illustrating a division of transmission units according to an example embodiment.

Referring to FIG. 9, take j=4 as an example. In FIG. 9, each TB1 is considered as one transmission unit.

4) when the number of repeated transmissions for each TB is j, the transmission unit includes a set of TBs, and the set of TBs includes k repetitions of the same TB, where $j>=2$ and $2<=k<=j$.

Figure 10:
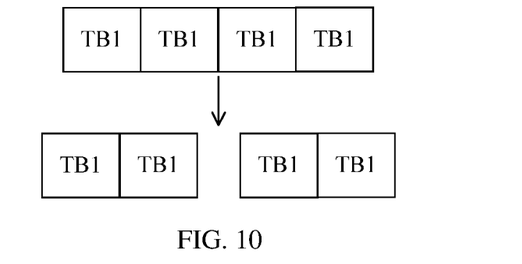
FIG. 10 is a schematic diagram illustrating a division of transmission units according to an example embodiment.

It should be noted that since the number of repeated transmissions for the TB is j, n=j/k. Referring to FIG. 10, take j=4 and k=2 as an example. In FIG. 10, each two TB1s are considered as one transmission unit. Or, when k=4, each four TB1s are considered as one transmission unit (not shown in FIG. 10).

At block 503, the transmitting end alternately transmits the n transmission units related to each TB to the receiving end in the time domain. The n transmission units are non-continuously transmitted in the time domain.

For ease of description, a concept of alternate transmission period is introduced in the embodiment. The alternate transmission period refers to a period during which one alternate transmission of the transmission unit is completed. The number s of TBs related to the alternate transmission period is the number of different TBs related to a plurality of transmission units transmitted during one alternate transmission. Assuming that the transmitting end generates four TBs, if the number of TBs related to the alternate transmission period is 2, then the transmitting end transmits TB1 and TB2 in the first transmission and after TB1 and TB2 are transmitted, the transmission end transmits TB3 and TB4 in the second transmission. If the number of TBs related to the alternate transmission period is 4, then the transmitting end transmits TB1, TB2, TB3 and TB4 in the first transmission.

The transmitting end may determine the number s according to second information predefined in the transmitting end. Or the transmitting end may calculate the number s according to a predefined second rule. Or, when the transmitting end is the terminal, the terminal may receive a second signaling transmitted by the access network device and determine the number s based on the second signaling. It should be noted that the transmitting end may determine the number s in the same way as the transmission unit, reference may be made to block 502, which is not repeated here.

It should be noted that the second rule mentioned here is different from the first rule in block 502. The second rule here may define determining the number s based on the number of TBs. For example, a fourth threshold may be predefined. If the number of TBs is less than or equal to the fourth threshold, it is determined that the number s is equal to m. If the number of TBs is greater than the fourth threshold, it is determined that the number s is less than m.

The ways of alternately transmitting the transmission units will be described respectively below based on the value of j and the division of the transmission units.

(I) j=1 and the transmission unit includes one sub-TB.

If the number of TBs related to each alternate transmission period is s, when $2<=s<m$, the $v^{th}$ alternate transmission period includes s sub-TBs, each of the s sub-TBs is the $v^{th}$ sub-TB of a respective TB of the s TBs, and the s TBs are the TBs which are not transmitted in the m TBs. When s=m, the $v^{th}$ alternate transmission period includes s sub-TBs, each of the s sub-TBs is the $v^{th}$ sub-TB of a respective TB of the m TBs, where $1<=v<=i$.

The transmitting end may realize the alternate transmission in many ways, one possible implementation way will be described below.

When s<m, s TBs which are not transmitted are selected from the m TBs. For the s TBs, in the $v^{th}$ alternate transmission, the $v^{th}$ sub-TB of each TB is selected from the s TBs and the s selected sub-TBs are transmitted to the receiving end. V is updated to v+1, and the step of selecting the $v^{th}$ sub-TB of each TB from the s TBs in the $v^{th}$ alternate transmission is performed until v is greater than i. Then the step of selecting s TBs which are not transmitted from the m TBs is performed until the m TBs are transmitted.

Figure 11:
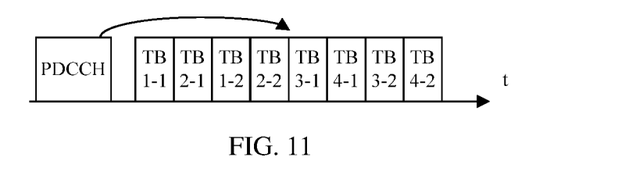
FIG. 11 is a schematic diagram illustrating an alternate transmission according to an example embodiment.

Referring to FIG. 11, TBm is divided into TBm-1 and TBm-2, and s=2. In the first alternate transmission period, TB1-1 and TB2-1 are transmitted. In the second alternate transmission period, TB1-2 and TB2-2 are transmitted. In the third alternate transmission period, TB3-1 and TB4-1 are transmitted. In the fourth alternate transmission period, TB3-2 and TB4-2 are transmitted.

When s=m, for m TBs, in the $v^{th}$ alternate transmission, the $v^{th}$ sub-TB of each TB is selected from the m TBs and the m selected sub-TBs are transmitted to the receiving end. V is updated to v+1, and the step of selecting the $v^{th}$ sub-TB of each TB from the m TBs in the $v^{th}$ alternate transmission is performed until v is greater than i.

Figure 12:
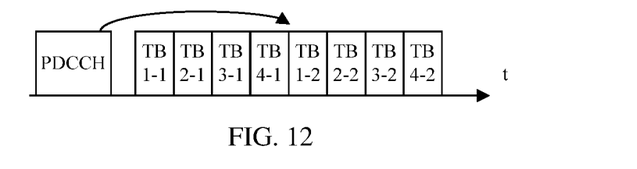
FIG. 12 is a schematic diagram illustrating an alternate transmission according to an example embodiment.

Referring to FIG. 12, TBm is divided into TBm-1 and TBm-2, and s=4. In the first alternate transmission period, TB1-1, TB2-1, TB3-1 and TB4-1 are transmitted. In the second alternate transmission period, TB1-2, TB2-2, TB3-2 and TB4-2 are transmitted.

(II) $j>=2$, the transmission unit includes one of one sub-TB, a set of sub-TBs, one TB, a set of TBs.

1) the transmission unit includes one sub-TB.

If the number of TBs related to each alternate transmission period is s, for the $k^{th}$ repeatedly transmitted s TBs, the s TBs are the TBs which are not transmitted in the m TBs. When $2<=s<m$, the $v^{th}$ alternate transmission period includes s sub-TBs, each of the s sub-TBs is the $v^{th}$ sub-TB of a respective TB of the s TBs. When s=m, the $v^{th}$ alternate transmission period includes s sub-TBs, each of the s sub-TBs is the $v^{th}$ sub-TB of a respective TB of the m TBs, where $j>=2$, $1<=k<=j$, $1<=v<=i$.

The implementation is similar to that described in (I). The difference is in that each TB is transmitted for k times in this implementation, and after s TBs are transmitted in one transmission, s TBs are transmitted in the next transmission.

Figure 13:
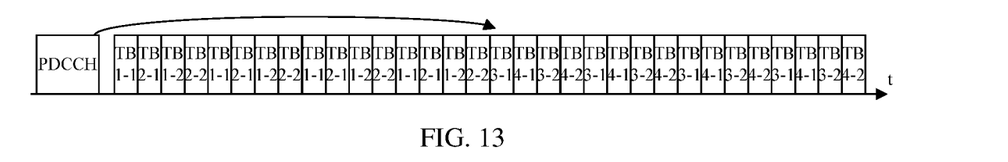
FIG. 13 is a schematic diagram illustrating an alternate transmission according to an example embodiment.

Referring to FIG. 13, TBm is divided into TBm-1 and TBm-2, and s=2. In the first, third, fifth and seventh alternate transmission periods, TB1-1 and TB2-1 are transmitted. In the second, fourth, sixth and eighth alternate transmission periods, TB1-2 and TB2-2 are transmitted. In the ninth, eleventh, thirteenth and fifteenth alternate transmission periods, TB3-1 and TB4-1 are transmitted. In the tenth, twelfth, fourteenth and sixteenth alternate transmission periods, TB3-2 and TB4-2 are transmitted.

Figure 14:
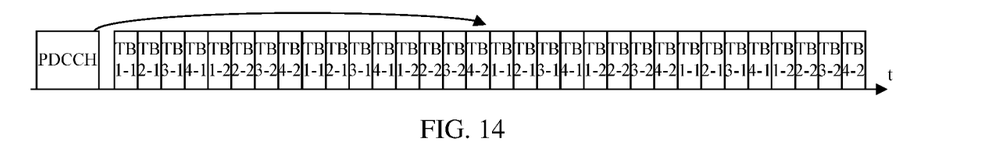
FIG. 14 is a schematic diagram illustrating an alternate transmission according to an example embodiment.

Referring to FIG. 14, TBm is divided into TBm-1 and TBm-2, and s=4. In the first, third, fifth and seventh alternate transmission periods, TB1-1, TB2-1, TB3-1 and TB4-1 are transmitted. In the second, fourth, sixth and eighth alternate transmission periods, TB1-2, TB2-2, TB3-2 and TB4-2 are transmitted.

2) the transmission unit includes one set of sub-TBs.

If the number of sets of TBs related to each alternate transmission period is s and the set of TBs includes k repetitions of the same TB, for the $p^{th}$ repeatedly transmitted s sets of TBs, the s sets of TBs are the sets of TBs which are not transmitted in the m sets of TBs. When 2<=s<m, the $v^{th}$ alternate transmission period includes s sets of sub-TBs, each set of the s sets of sub-TBs is the $v^{th}$ set of sub-TBs of a respective set of TBs of the s sets of TBs. When s=m, the $v^{th}$ alternate transmission period includes s sets of sub-TBs, each set of the s sets of sub-TBs is the $v^{th}$ set of sub-TBs of a respective set of TBs of the m sets of TBs, where 1<=p<=j/k, 1<=v<=i.

The transmitting end may realize the alternate transmission in many ways, one possible implementation way will be described below.

When s<m, s sets of TBs which are not transmitted are selected from the m sets of TBs. For the $p^{th}$ repeatedly transmitted s sets of TBs, in the $v^{th}$ alternate transmission, the $v^{th}$ set of sub-TBs of each set TBs is selected from the s sets of TBs and the s selected sets of sub-TBs are transmitted to the receiving end. V is updated to v+1, and the step of selecting the $v^{th}$ set of sub-TBs of each set of TBs from the s sets of TBs in the $v^{th}$ alternate transmission is performed until v is greater than i. Then the step of selecting s sets of TBs which are not transmitted from the m sets of TBs is performed until the m sets of TBs are transmitted.

Figure 15:
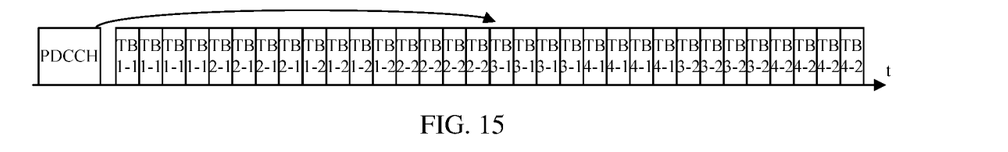
FIG. 15 is a schematic diagram illustrating an alternate transmission according to an example embodiment.

Referring to FIG. 15, TBm is divided into TBm-1 and TBm-2, s=2 and k=4. In the first alternate transmission period, the set of TB1-1s and the set of TB2-1s are transmitted. In the second alternate transmission period, the set of TB1-2s and the set of TB2-2s are transmitted. In the third alternate transmission period, the set of TB3-1s and the set of TB4-1s are transmitted. In the fourth alternate transmission period, the set of TB3-2s and the set of TB4-2s are transmitted.

When s=m, for m TBs, for the $p^{th}$ repeatedly transmitted m sets of TBs, in the $v^{th}$ alternate transmission, the $v^{th}$ set of sub-TBs of each set of TBs is selected from the m sets of TBs and the m selected sets of sub-TBs are transmitted to the receiving end. V is updated to v+1, and the step of selecting the $v^{th}$ set of sub-TBs of each set of TBs from the m sets of TBs in the $v^{th}$ alternate transmission is performed until v is greater than i.

Figure 16:
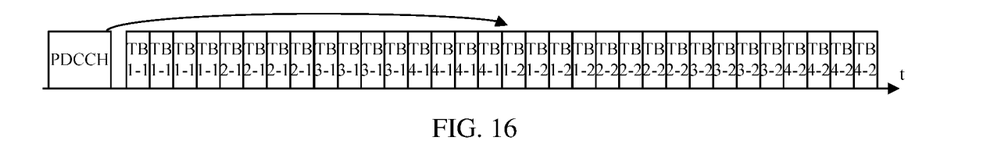
FIG. 16 is a schematic diagram illustrating an alternate transmission according to an example embodiment.

Referring to FIG. 16, TBm is divided into TBm-1 and TBm-2, s=4 and k=4. In the first alternate transmission period, the set of TB1-1s, the set of TB2-1s, the set of TB3-1s and the set of TB4-1s are transmitted. In the second alternate transmission period, the set of TB1-2s, the set of TB2-2s, the set of TB3-2s and the set of TB4-2s are transmitted.

3) the transmission unit includes one TB.

If the number of TBs related to each alternate transmission period is s, when 2<=s<m, the $v^{th}$ alternate transmission period includes s TBs, the s TBs are the TBs which are not transmitted in the m TBs. When s=m, the $v^{th}$ alternate transmission period includes s TBs which are the m TBs, where 1<=v<=j.

The transmitting end may realize the alternate transmission in many ways, and one possible implementation way will be described below.

When s<m, s TBs which are not transmitted are selected from the m TBs. For the $p^{th}$ repeatedly transmitted s TBs, the s TBs are transmitted to the receiving end until the number of repeated transmissions of the s TBs is equal to j. Then the step of selecting s TBs which are not transmitted from the m TBs is performed until the m TBs are transmitted.

Figure 17:
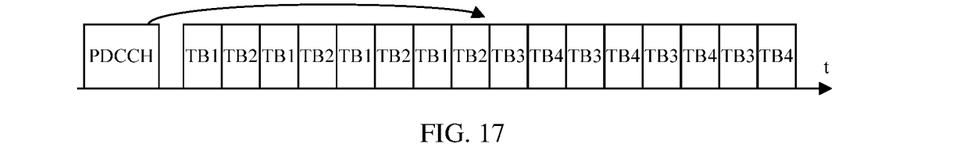
FIG. 17 is a schematic diagram illustrating an alternate transmission according to an example embodiment.

Referring to FIG. 17, s=2. In the first, second, third and fourth alternate transmission periods, TB1 and TB2 are transmitted. In the fifth, sixth, seventh and eighth alternate transmission periods, TB3 and TB4 are transmitted.

When s=m, for the $p^{th}$ repeatedly transmitted m TBs, the m TBs are transmitted to the receiving end until the number of repeated transmissions of the m TBs is equal to j.

Figure 18:
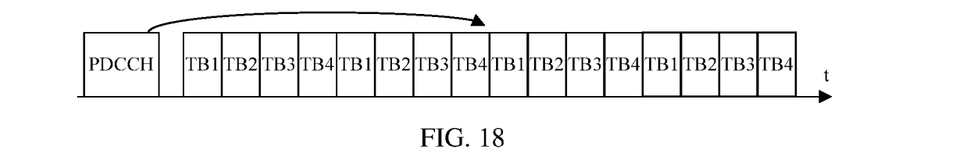
FIG. 18 is a schematic diagram illustrating an alternate transmission according to an example embodiment.

Referring to FIG. 18, s=4. In the first, second, third and fourth alternate transmission periods, TB1, TB2, TB3 and TB4 are transmitted.

4) the transmission unit includes one set of TBs.

If the number of sets of TBs related to each alternate transmission period is s, when 2<=s<m, the $v^{th}$ alternate transmission period includes s sets of TBs, the s sets of TBs are the sets of TBs which are not transmitted in the m sets of TBs. When s=m, the $v^{th}$ alternate transmission period includes s sets of sub-TBs which are the m sets of TBs, where 1<=v<=j/k.

The transmitting end may realize the alternate transmission in many ways, one possible implementation way will be described below.

When s<m, s sets of TBs which are not transmitted are selected from the m sets of TBs. For the $p^{th}$ repeatedly transmitted s sets of TBs, the s sets of TBs are transmitted to the receiving end until the number of repeated transmissions of the s sets of TBs is equal to j/k. Then the step of selecting s sets of TBs which are not transmitted from the m sets of TBs is performed until the m sets of TBs are transmitted.

Figure 19:
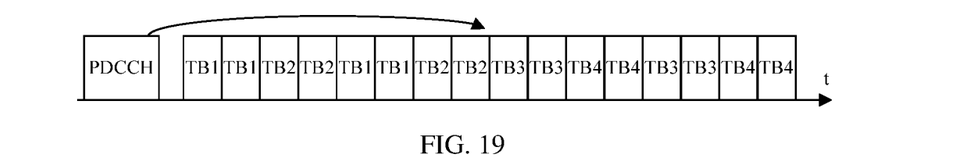
FIG. 19 is a schematic diagram illustrating an alternate transmission according to an example embodiment.

Referring to FIG. 19, s=2 and k=4. In the first and second alternate transmission periods, the set of TB1s and the set of TB2s are transmitted. In the third and fourth alternate transmission periods, the set of TB3s and the set of TB4s are transmitted.

When s=m, for the $p^{th}$ repeatedly transmitted m sets of TBs, the m sets of TBs are transmitted to the receiving end until the number of repeated transmissions of the m sets of TBs is equal to j/k.

Figure 20:
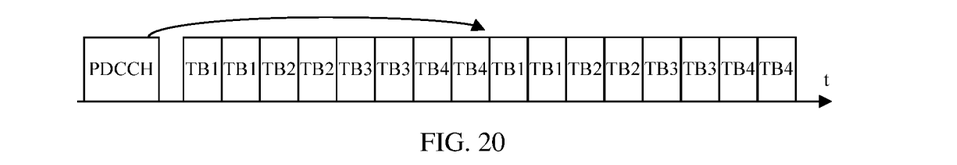
FIG. 20 is a schematic diagram illustrating an alternate transmission according to an example embodiment.

Referring to FIG. 20, s=4 and k=4. In the first and second alternate transmission periods, the set of TB1s, the set of TB2s, the set of TB3s and the set of TB4s are transmitted.

At block 504, the receiving end receives the n transmission units related to each TB alternately transmitted by the transmitting end in the time domain.

At block 505, the receiving end combines the n transmission units related to each TB to obtain the data to be transmitted.

The receiving end may determine the transmission unit and combine the received transmission units based on the alternate transmission period of the transmitting end transmitting the n transmission units related to each TB to obtain the data.

When determining the transmission unit, the receiving end may determine the transmission unit according to first information predefined in the receiving end. Or, the receiving end may calculate the transmission unit according to a predefined first rule. Or, when the receiving end is the terminal, the terminal may receive a first signaling sent by the access network device, and determine the transmission unit according to the first signaling. The above three implementation ways are similar to those three ways of determining the transmission unit by the transmitting end in block 502, thus reference can be made to the above description, which is not repeated here.

When combining the received transmission units within each alternate transmission period, the receiving end may further determine the number s of the TBs related to the alternate transmission period. The receiving end may determine the number s according to second information predefined in the receiving end. Or, the receiving end may calculate the number s according to a predefined second rule. Or, when the receiving end is the terminal, the terminal may receive a second signaling sent by the access network device, and determine the number s according to the second signaling. The above three implementation ways are similar to those three ways of determining the number s by the transmitting end in block 502, thus reference can be made to the above description, which is not repeated here.

Steps at blocks 501-503 can be separately implemented as an embodiment at the transmitting end, and steps at blocks 504-505 can be separately implemented as an embodiment at the receiving end.

In conclusion, with the method for transmitting data according to the present disclosure, the related transmission content of each TB is divided into n transmission units, and the n transmission units related to each TB are transmitted alternately, so as to transmit the n transmission units non-continuously in the time domain. In this way, for the n transmission units related to one TB, even though the channel status is poor when some transmission units are transmitted, only these transmission units which are transmitted at this time are affected while other transmission units which are transmitted at other times are not affected, such that the problem that all the data in the TB cannot be received correctly because the channel status is unstable when the n transmission units are intensively transmitted can be avoided, thus improving accuracy of data transmission.

Figure 21:
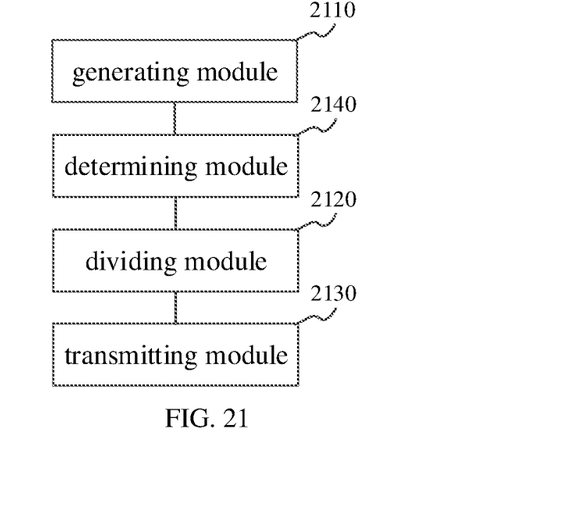
FIG. 21 is a block diagram illustrating an apparatus for transmitting data according to an example embodiment.

FIG. 21 is a block diagram illustrating an apparatus for transmitting data according to an example embodiment. The apparatus is applied in the transmitting end 301 shown in FIG. 3. As illustrated in FIG. 21, the apparatus includes a generating module 2110, a dividing module 2120 and a transmitting module 2130.

The generating module 2110 is configured to generate m transmission blocks (TBs) based on data to be transmitted, in which each TB includes partial data of the data to be transmitted, where m$>$=2.

The dividing module 2120 is configured to divide related transmission content of each TB into n transmission units in time domain, where n$>$=2.

The transmitting module 2130 is configured to transmit the n transmission units related to each TB to a receiving end alternately in the time domain, in which the n transmission units are non-continuously transmitted in the time domain.

In an embodiment of the present disclosure, the apparatus further includes a determining module 2140.

The determining module 2140 is configured to determine the transmission unit based on first information predefined in the transmitting end. Or, the determining module 2140 is configured to calculate the transmission unit based on a predefined first rule. Or, when the transmitting end is the terminal, the determining module 2140 is configured to receive a first signaling sent by the access network device, and determine the transmission unit based on the first signaling.

In an embodiment of the present disclosure, when each TB is divided into i sub-TBs, the transmission unit includes one sub-TB, where i$>$=2.

In an embodiment of the present disclosure, if the m TBs are not repeatedly transmitted and the number of TBs related to each alternate transmission period is s, when $2<=s<m$, the $v^{th}$ alternate transmission period includes s sub-TBs, the s sub-TBs are the $v^{th}$ sub-TBs of respective TBs of the s TBs, and the s TBs are the TBs which are not transmitted in the m TBs. When s=m, the $v^{th}$ alternate transmission period includes s sub-TBs, each of the s sub-TBs is the $v^{th}$ sub-TB of a respective TB of the m TBs, where $1<=v<=i$.

In an embodiment of the present disclosure, if the number of repeated transmissions of the m TBs is j and the number of TBs related to each alternate transmission period is s, for the $k^{th}$ repeatedly transmitted s TBs, the s TBs are the TBs which are not transmitted in the m TBs. When $2<=s<m$, the $v^{th}$ alternate transmission period includes s sub-TBs, the s sub-TBs are the $v^{th}$ sub-TBs of respective TBs of the s TBs. When s=m, the $v^{th}$ alternate transmission period includes s sub-TBs, the s sub-TBs are the $v^{th}$ sub-TBs of respective TBs of the m TBs, where $j>=2$, $1<=k<=j$, $1<=v<=i$.

In an embodiment of the present disclosure, when each TB is divided into i sub-TBs and the number of repeated transmissions of each TB is j, the transmission unit includes a set of sub-TBs. The set of sub-TBs includes k repetitions of the same sub-TB, where $i>=2$, $j>=2$ and $2<=k<=j$.

In an embodiment of the present disclosure, if the number of sets of TBs related to each alternate transmission period is s and the set of TBs includes k repetitions of the same TB, for the $p^{th}$ repeatedly transmitted s sets of TBs, the s sets of TBs are the sets of TBs which are not transmitted in the m sets of TBs. When $2<=s<m$, the $v^{th}$ alternate transmission period includes s sets of sub-TBs, the s sets of sub-TBs are the $v^{th}$ sets of sub-TBs of respective sets of TBs of the s sets of TBs. When s=m, the $v^{th}$ alternate transmission period includes s sets of sub-TBs, the s sets of sub-TBs are the $v^{th}$ sets of sub-TBs of respective sets of TBs of the m sets of TBs, where $1<=p<=j/k$, $1<=v<=i$.

In an embodiment of the present disclosure, when the number of repeated transmissions for each TB is j, the transmission unit includes one TB, where j$>$=2.

In an embodiment of the present disclosure, if the number of TBs related to each alternate transmission period is s, when $2<=s<m$, the $v^{th}$ alternate transmission period includes s TBs, the s TBs are the TBs which are not transmitted in the m TBs. When s=m, the $v^{th}$ alternate transmission period includes s TBs which are the m TBs, where $1<=v<=j$.

In an embodiment of the present disclosure, when the number of repeated transmissions for each TB is j, the transmission unit includes a set of TBs, and the set of TBs includes k repetitions of the same TB, where $j>=2$ and $2<=k<=j$.

In an embodiment of the present disclosure, if the number of sets of TBs related to each alternate transmission period is s, when $2<=s<m$, the $v^{th}$ alternate transmission period includes s sets of TBs, the s sets of TBs are the sets of TBs which are not transmitted in the m sets of TBs. When s=m, the $v^{th}$ alternate transmission period includes s sets of sub-TBs which are the m sets of TBs, where $1<=v<=j/k$.

In an embodiment of the present disclosure, the determining module 2140 is further configured to determine the number s based on second information predefined in the transmitting end. Or, the determining module 2140 is further configured to calculate the number s based on a predefined second rule. Or, when the transmitting end is the terminal, the determining module 2140 is further configured to receive a second signaling sent by the access network device, and determine the number s based on the second signaling.

In conclusion, with the apparatus for transmitting data according to the present disclosure, the related transmission content of each TB is divided into n transmission units, and the n transmission units related to each TB are transmitted alternately, so as to transmit the n transmission units non-continuously in the time domain. In this way, for the n transmission units related to one TB, even though the channel status is poor when some transmission units are transmitted, only these transmission units which are transmitted at this time are affected while other transmission units which are transmitted at other times are not affected, such that the problem that all the data in the TB cannot be received correctly because the channel status is unstable when the n transmission units are intensively transmitted can be avoided, thus improving accuracy of data transmission.

Figure 22:
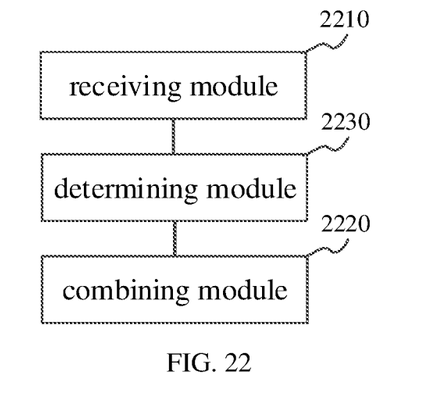
FIG. 22 is a block diagram illustrating an apparatus for transmitting data according to an example embodiment.

FIG. 22 is a block diagram illustrating an apparatus for transmitting data according to an example embodiment. The apparatus is applied in the receiving end 302 shown in FIG. 3. As illustrated in FIG. 22, the apparatus includes a receiving module 2210 and a combining module 2220.

The receiving module 2210 is configured to receive n transmission units related to each TB alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where $m>=2$ and $n>=2$.

The combining module 2220 is configured to combine the n transmission units related to each TB to obtain the data to be transmitted.

In an embodiment of the present disclosure, the apparatus further includes a determining module 2230.

The determining module 2230 is configured to determine the transmission unit based on first information predefined in the receiving end. Or, the determining module 2230 is configured to calculate the transmission unit based on a predefined first rule. Or, when the receiving end is the terminal, the determining module 2230 is configured to receive a first signaling sent by the access network device, and determine the transmission unit based on the first signaling.

In an embodiment of the present disclosure, when each TB is divided into i sub-TBs, the transmission unit includes one sub-TB, where $i>=2$.

In an embodiment of the present disclosure, if the m TBs are not repeatedly transmitted and the number of TBs related to each alternate transmission period is s, when $2<=s<m$, the $v^{th}$ alternate transmission period includes s sub-TBs, the s sub-TBs are the $v^{th}$ sub-TBs of respective TBs of the s TBs, and the s TBs are the TBs which are not transmitted in the m TBs. When $s=m$, the $v^{th}$ alternate transmission period includes s sub-TBs, the s sub-TBs are the $v^{th}$ sub-TBs of respective TBs of the m TBs, where $1<=v<=i$.

In an embodiment of the present disclosure, if the number of repeated transmissions of the m TBs is j and the number of TBs related to each alternate transmission period is s, for the $k^{th}$ repeatedly transmitted s TBs, the s TBs are the TBs which are not transmitted in the m TBs. When $2<=s<m$, the $v^{th}$ alternate transmission period includes s sub-TBs, the s sub-TBs are the $v^{th}$ sub-TBs of respective TBs of the s TBs. When $s=m$, the $v^{th}$ alternate transmission period includes s sub-TBs, the s sub-TBs are the $v^{th}$ sub-TBs of respective TBs of the m TBs, where $j>=2$, $1<=k<=j$, $1<=v<=i$.

In an embodiment of the present disclosure, when each TB is divided into i sub-TBs and the number of repeated transmissions of each TB is j, the transmission unit includes a set of sub-TBs. The set of sub-TBs includes k repetitions of the same sub-TB, where $i>=2$, $j>=2$ and $2<=k<=j$.

In an embodiment of the present disclosure, if the number of sets of TBs related to each alternate transmission period is s and the set of TBs includes k repetitions of the same TB, for the $p^{th}$ repeatedly transmitted s sets of TBs, the s sets of TBs are the sets of TBs which are not transmitted in the m sets of TBs. When $2<=s<m$, the $v^{th}$ alternate transmission period includes s sets of sub-TBs, the s sets of sub-TBs are the $v^{th}$ sets of sub-TBs of respective sets of TBs of the s sets of TBs. When $s=m$, the $v^{th}$ alternate transmission period includes s sets of sub-TBs, the s sets of sub-TBs are the $v^{th}$ sets of sub-TBs of respective sets of TBs of the m sets of TBs, where $1<=p<=j/k$, $1<=v<=i$.

In an embodiment of the present disclosure, when the number of repeated transmissions for each TB is j, the transmission unit includes one TB, where $j>=2$.

In an embodiment of the present disclosure, if the number of TBs related to each alternate transmission period is s, when $2<=s<m$, the $v^{th}$ alternate transmission period includes s TBs, the s TBs are the TBs which are not transmitted in the m TBs. When $s=m$, the $v^{th}$ alternate transmission period includes s TBs which are the m TBs, where $1<=v<=j$.

In an embodiment of the present disclosure, when the number of repeated transmissions for each TB is j, the transmission unit includes a set of TBs, and the set of TBs includes k repetitions of the same TB, where $j>=2$ and $2<=k<=j$.

In an embodiment of the present disclosure, if the number of sets of TBs related to each alternate transmission period is s, when $2<=s<m$, the $v^{th}$ alternate transmission period includes s sets of TBs, the s sets of TBs are the sets of TBs which are not transmitted in the m sets of TBs. When $s=m$, the $v^{th}$ alternate transmission period includes s sets of sub-TBs which are the m sets of TBs, where $1<=v<=j/k$.

In an embodiment of the present disclosure, the determining module 2230 is further configured to determine the number s based on second information predefined in the receiving end. Or, the determining module 2230 is further configured to calculate the number s based on a predefined second rule. Or, when the receiving end is the terminal, the determining module 2230 is further configured to receive a second signaling sent by the access network device, and determine the number s based on the second signaling.

In conclusion, with the apparatus for transmitting data according to the present disclosure, the n transmission units related to each TB which are transmitted alternately by the transmitting end in the time domain are received, so as to receive the n transmission units non-continuously in the time domain. In this way, for the n transmission units related to one TB, even though the channel status is poor when some transmission units are transmitted, only these transmission units which are transmitted at this time are affected while other transmission units which are transmitted at other times are not affected, such that the problem that all the data in the TB cannot be received correctly because the channel status is unstable when the n transmission units are intensively transmitted can be avoided, thus improving accuracy of data transmission.

Embodiments of the present disclosure provide a transmitting end, which can implement the method for transmitting data provided in the present disclosure. The UE includes a processor and memory configured to store instructions executable by the processor.

The processor is configured to generate m transmission blocks (TBs) based on data to be transmitted, in which each TB includes partial data of the data to be transmitted, where m>=2; divide related transmission content of each TB into n transmission units in time domain, where n>=2; and transmit the n transmission units related to each TB to a receiving end alternately in the time domain, in which the n transmission units are non-continuously transmitted in the time domain.

Embodiments of the present disclosure provide a receiving end, which can implement the method for transmitting data provided in the present disclosure. The bases station includes a processor and memory configured to store instructions executable by the processor.

The processor is configured to receive n transmission units related to each TB alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where m>=2 and n>=2; and combine the n transmission units related to each TB to obtain the data to be transmitted.

Figure 23:
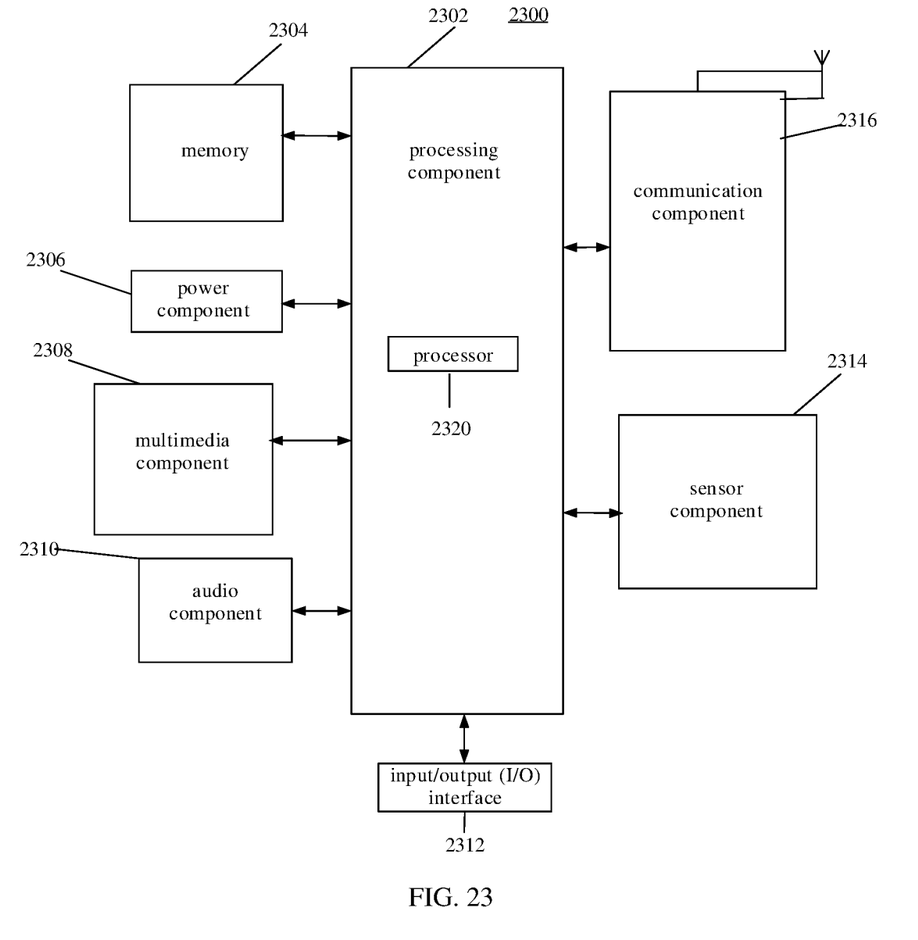
FIG. 23 is a block diagram illustrating a device for transmitting data according to an example embodiment.

FIG. 23 is a block diagram of a device 2300 for transmitting data according to an example embodiment. For example, the device 2300 may be a mobile phone, a computer, a digital broadcasting terminal, a messaging device, a game console, a tablet device, a medical device, a fitness device, a personal digital assistant, etc.

As illustrated in FIG. 23, the device 2300 may include one or more components: a processing component 2302, memory 2304, a power component 2306, a multimedia component 2308, an audio component 2310, an input/output (I/O) interface 2312, a sensor component 2314, and a communication component 2316.

The processing component 2302 generally controls the overall operations of the device 2300, such as operations associated with display, telephone calls, data communications, camera operations, and recording operations. The processing component 2302 may include one or more processors 2320 to execute instructions to complete all or part of the steps of the foregoing method. In addition, the processing component 2302 may include one or more modules to facilitate the interaction between the processing component 2302 and other components. For example, the processing component 2302 may include a multimedia module to facilitate the interaction between the multimedia component 2308 and the processing component 2302.

The memory 2304 is configured to store various types of data to support operations in the device 2300. Examples of these data include instructions for any application or method operating on the device 2300, contact data, phone book data, messages, pictures, videos, and so on. The memory 2304 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 2306 provides power to various components of the device 2300. The power component 2306 may include a power management system, one or more power supplies, and other components associated with generating, managing, and distributing power for the device 2300.

The multimedia component 2308 includes a screen that provides an output interface between the device 2300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 2308 includes a front camera and/or a rear camera. When the device 2300 is in an operation mode, such as a shooting mode or a video mode, the front camera and/or the rear camera can receive external multimedia data. Each front camera and rear camera can be a fixed optical lens system or an optical lens system having focal length and optical zoom capabilities.

The audio component 2310 is configured to output and/or input audio signals. For example, the audio component 2310 includes a microphone (MIC). When the device 2300 is in an operating mode, such as a call mode, a recording mode, and a voice recognition mode, the microphone is configured to receive external audio signals. The received audio signals may be further stored in the memory 2304 or transmitted via the communication component 2316. In some embodiments, the audio component 2310 further includes a speaker for outputting audio signals.

The I/O interface 2312 provides an interface between the processing component 2302 and a peripheral interface module. The above-mentioned peripheral interface module may be a keyboard, a click wheel, a button, and the like. These buttons may include but are not limited to: home button, volume button, start button, and lock button.

The sensor component 2314 includes one or more sensors for providing the device 2300 with various aspects of state assessment. For example, the sensor component 2314 can detect the open/close state of the device 2300 and the relative positioning of components, such as the display and keypad of the device 2300. The sensor component 2314 can also detect the position change of the device 2300 or a component of the device 2300, presence or absence of contact of the user to the device 2300, the orientation or acceleration/deceleration of the device 2300, and the temperature change of the device 2300. The sensor component 2314 may include a proximity sensor configured to detect the presence of nearby objects when there is no physical contact. The sensor component 2314 may also include a light sensor, such as a complementary metal-oxide-semiconductor (CMOS) or charge-coupled device (CCD) image sensor, for use in imaging applications. In some embodiments, the sensor component 2314 may also include an acceleration sensor, a gyroscope sensor, a magnetic sensor, a pressure sensor or a temperature sensor.

The communication component 2316 is configured to facilitate wired or wireless communication between the device 2300 and other devices. The device 2300 can access a wireless network based on a communication standard, such as Wireless Fidelity (Wi-Fi), 2G, or 3G, or a combination thereof. In an exemplary embodiment, the communication component 2316 receives a broadcast signal or broadcast related information from an external broadcast management system via a broadcast channel. In an exemplary embodiment, the communication component 2316 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 2300 may be implemented by one or more application specific integrated circuits (ASICs), digital signal processors (DSP), digital signal processing devices (DSPD), programmable logic devices (PLD), field programmable gate array (FPGA), controller, microcontroller, microprocessor, or other electronic components, used to perform the above methods.

Another exemplary embodiment of the present disclosure provides a non-transitory computer-readable storage medium, such as memory 2304 including instructions, which can be executed by the processor 2320 of the device 2300 to complete the foregoing method. For example, the computer-readable storage medium may be ROM, random access memory (RAM), CD-ROM, magnetic tape, floppy disk, optical data storage device, etc.

A non-transient computer-readable storage medium is provided. When the instructions in the storage medium are executed by a processor of a mobile terminal, the mobile terminal can execute the above method.

Figure 24:
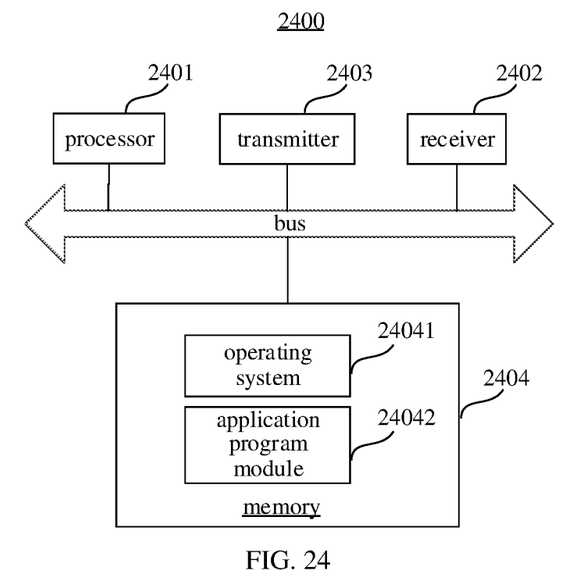
FIG. 24 is a block diagram illustrating a device for transmitting data according to an example embodiment.

FIG. 24 is a block diagram illustrating a device 2400 for transmitting data according to an example embodiment. For example, the device 2400 may be a base station. As illustrated in FIG. 24, the device 2400 may include a processor 2401, a receiver 2402, a transmitter 2403 and memory 2404. The receiver 2402, the transmitter 2403 and the memory 2404 are respectively connected to the processor 2401 via a bus.

The processor 2401 includes one or more processing core. The processor 2401 may implement the method for transmitting data which is executed by the base station according to the embodiments of the present disclosure by running software programs and modules. The memory 2404 may be configured to store the software programs and modules. In detail, the memory 2404 may store an operating system 24041 and at least one application program module 24042 for desired functionalities. The receiver 2402 may be configured to receive communication data sent by other devices. The transmitter 2403 may be configured to send the communication data to other devices.

Figure 25:
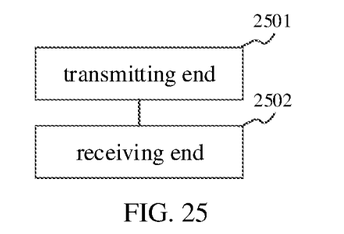
FIG. 25 is a block diagram illustrating a data transmission system according to an example embodiment.

FIG. 25 is a block diagram illustrating a data transmission system according to an example embodiment. As illustrated in FIG. 25, the data transmission system includes a transmitting end 2501 and a receiving end 2502.

The transmitting end 2501 is configured to implement the method for transmitting data which is executed by the transmitting end according to embodiments described with reference to FIG. 4-FIG. 20.

The receiving end 2502 is configured to implement the method for transmitting data which is executed by the receiving end according to embodiments described with reference to FIG. 4-FIG. 20.

Embodiments of the present disclosure provide a computer-readable storage medium. The storage medium has at least one instruction, at least one program, and at least one set of codes or set of instructions stored therein. The at least one instruction, the at least one program, and the at least one set of codes or set of instructions are loaded and executed by a processor to implement the method for transmitting data described above.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for transmitting data, applicable in a transmitting end, comprising:
    generating m transmission blocks (TBs) based on data to be transmitted, wherein each TB includes partial data of the data to be transmitted, where $m>=2$;
    dividing related transmission content of each TB into n transmission units in time domain, where $n>=2$;
    determining each of the n transmission units based on first information predefined in the transmitting end or determining each of the n transmission units based on a predefined first rule, wherein the first information is determined based on a communication protocol, and the predefined first rule defines determining each of the n transmission units based on a time granularity corresponding to each TB; and
    transmitting the n transmission units related to each TB to a receiving end alternately in the time domain, wherein the n transmission units are non-continuously transmitted in the time domain, wherein one alternate transmission is completed during each alternate transmission period, and transmission units transmitted in each alternate transmission period belong to s TBs, respectively, where $2<=s<=m$.

2. The method of claim 1, wherein when each TB is divided into i sub-TBs, each of the n transmission units includes a sub-TB, where $i>=2$.

3. The method of claim 2, wherein when the m TBs are transmitted repeatedly for j times, and each alternate transmission period relates to the s TBs, for the $k^{th}$ repeatedly transmitted s TBs, the s TBs are the TBs which are not transmitted in the m TBs,
    when $2<=s<m$, the $v^{th}$ alternate transmission period includes s sub-TBs, each of the s sub-TBs is the $v^{th}$ sub-TB of a respective TB of the s TBs;
    when $s=m$, the $v^{th}$ alternate transmission period includes s sub-TBs, each of the s sub-TBs is the $v^{th}$ sub-TB of a respective TB of the m TBs;
    where $j>=2$, $1<=k<=j$, $1<=v<=i$.

4. The method of claim 2, wherein when the m TBs are not transmitted repeatedly and each alternate transmission period relates to the s TBs,
    when $2<=s<m$, the $v^{th}$ alternate transmission period includes s sub-TBs, each of the s sub-TBs is the $v^{th}$ sub-TB of a respective TB of the s TBs, and the s TBs are the TBs which are not transmitted in the m TBs;
    when $s=m$, the $v^{th}$ alternate transmission period includes s sub-TBs, each of the s sub-TBs is the $v^{th}$ sub-TB of a respective TB of the m TBs;
    where $1<=v<=i$.

5. The method of claim 4 further comprising at least one of:
    determining s based on second information predefined in the transmitting end;
    calculating s based on a predefined second rule; or receiving a second signaling sent by an access network device when the transmitting end is a terminal, and determining s based on the second signaling.

6. The method of claim 1, wherein when each TB is divided into i sub-TBs and each TB is transmitted repeatedly for j times, the transmission unit includes a set of sub-TBs, the set of sub-TBs includes k repetitions of the same sub-TB, where i>=2, j>=2 and 2<=k<=j.

7. The method of claim 6, wherein when each alternate transmission period relates to s sets of TBs and each of the s sets of TBs includes k repetitions of the same TB, for the $p^{th}$ repeatedly transmitted s sets of TBs, the s sets of TBs are the sets of TBs which are not transmitted in m sets of TBs,
when 2<=s<m, the $v^{th}$ alternate transmission period includes s sets of sub-TBs, each of the s sets of sub-TBs is the $v^{th}$ set of sub-TBs of a respective set of TBs of the s sets of TBs;
when s=m, the $v^{th}$ alternate transmission period includes s sets of sub-TBs, each of the s sets of sub-TBs is the $v^{th}$ set of sub-TBs of a respective set of TBs of the m sets of TBs;
where 1<=p<=j/k, 1<=v<=i.

8. The method of claim 1, wherein when each TB is transmitted repeatedly for j times, the transmission unit includes a TB, where j>=2.

9. The method of claim 8, wherein when each alternate transmission period relates to the s TBs,
when 2<=s<m, the $v^{th}$ alternate transmission period includes s TBs which are not transmitted in the m TBs;
when s=m, the $v^{th}$ alternate transmission period includes s TBs which are the m TBs;
where 1<=v<=j.

10. The method of claim 1, wherein when each TB is transmitted repeatedly for j times, the transmission unit includes a set of TBs, and the set of TBs includes k repetitions of the same TB, where j>=2 and 2<=k<=j.

11. The method of claim 10, wherein when each alternate transmission period relates to s sets of TBs,
when 2<=s<m, the $v^{th}$ alternate transmission period includes s sets of TBs, the s sets of TBs are the sets of TBs which are not transmitted in m sets of TBs;
when s=m, the $v^{th}$ alternate transmission period includes s sets of TBs which are the m sets of TBs;
where 1<=v<=j/k.

12. A transmitting end, comprising:
a processor; and
memory configured to store instructions executable by the processor;
wherein the processor is configured to perform the method of claim 1.

13. A method for transmitting data, applicable in a receiving end, comprising:
receiving n transmission units related to each transmission block (TB) alternately transmitted by a transmitting end in time domain, in which the n transmission units are non-continuously transmitted in the time domain, the n transmission units are obtained by dividing in the time domain related transmission content of each of m TBs generated by the transmitting end based on data to be transmitted, and each TB includes partial data of the data to be transmitted, where m>=2 and n>=2, wherein each of the n transmission units is determined based on first information predefined in the transmitting end or determined based on a predefined first rule, wherein the first information is determined based on a communication protocol, and the predefined first rule defines determining each of the n transmission units based on a time granularity corresponding to each TB; and
combining the n transmission units related to each TB to obtain the data to be transmitted;
wherein one alternate transmission is completed during each alternate transmission period, and transmission units transmitted in each alternate transmission period belong to s TBs, respectively, where 2<=s<=m.

14. The method of claim 13, wherein when each TB is divided into i sub-TBs, each of then transmission units includes a sub-TB, where i>=2.

15. The method of claim 14, wherein when the m TBs are not transmitted repeatedly and each alternate transmission period relates to the s TBs,
when 2<=s<m, the $v^{th}$ alternate transmission period includes s sub-TBs, each of the s sub-TBs is the $v^{th}$ sub-TB of a respective TB of the s TBs, and the s TBs are the TBs which are not transmitted in the m TBs;
when s=m, the $v^{th}$ alternate transmission period includes s sub-TBs, each of the s sub-TBs is the $v^{th}$ sub-TB of a respective TB of the m TBs;
where 1<=v<=i.

16. The method of claim 15, further comprising at least one of:
determining s based on second information predefined in the receiving end;
calculating s based on a predefined second rule; or
receiving a second signaling sent by an access network device when the receiving end is a terminal, and determining s based on the second signaling.

17. The method of claim 14, wherein when the m TBs are transmitted repeatedly for j times, and each alternate transmission period relates to the s TBs, for the $k^{th}$ repeatedly transmitted s TBs, the s TBs are the TBs which are not transmitted in the m TBs,
when 2<=s<m, the $v^{th}$ alternate transmission period includes s sub-TBs, each of the s sub-TBs is the $v^{th}$ sub-TB of a respective TB of the s TBs;
when s=m, the $v^{th}$ alternate transmission period includes s sub-TBs, each of the s sub-TBs is the $v^{th}$ sub-TB of a respective TB of the m TBs;
where j>=2, 1<=k<=j, 1<=v<=i.

18. The method of claim 13, wherein when each TB is divided into i sub-TBs and each TB is transmitted repeatedly for j times, the transmission unit includes a set of sub-TBs, the set of sub-TBs includes k repetitions of the same sub-TB, where i>=2, j>=2 and 2<=k<=j.

19. The method of claim 18, wherein when each alternate transmission period relates to s sets of TBs and each of the s sets of TBs includes k repetitions of the same TB, for the $p^{th}$ repeatedly transmitted s sets of TBs, the s sets of TBs are the sets of TBs which are not transmitted in m sets of TBs,
when 2<=s<m, the $v^{th}$ alternate transmission period includes s sets of sub-TBs, each of the s sets of sub-TBs is the $v^{th}$ set of sub-TBs of a respective set of TBs of the s sets of TBs;
when s=m, the $v^{th}$ alternate transmission period includes s sets of sub-TBs, each of the s sets of sub-TBs is the $v^{th}$ set of sub-TBs of a respective set of TBs of the m sets of TBs;
where 1<=p<=j/k, 1<=v<=i.

20. The method of claim 13, wherein when each TB is transmitted repeatedly for j times, the transmission unit includes a TB, where j>=2.

21. The method of claim 20, wherein when each alternate transmission period relates to the s TBs, when $2<=s<m$, the $v^{th}$ alternate transmission period includes s TBs which are not transmitted in the m TBs;

when $s=m$, the $v^{th}$ alternate transmission period includes s TBs which are the m TBs;

where $1<=v<=j$.

22. The method of claim 13, wherein when each TB is transmitted repeatedly for j times, the transmission unit includes a set of TBs, and the set of TBs includes k repetitions of the same TB, where $j>=2$ and $2<=k<=j$.

23. The method of claim 22, wherein when each alternate transmission period relates to s sets of TBs, when $2<=s<m$, the $v^{th}$ alternate transmission period includes s sets of TBs, the s sets of TBs are the sets of TBs which are not transmitted in m sets of TBs;

when $s=m$, the $v^{th}$ alternate transmission period includes s sets of TBs which are the m sets of TBs;

where $1<=v<=j/k$.

24. A receiving end, comprising:

a processor; and memory configured to store instructions executable by the processor;

wherein the processor is configured to perform the method of claim 13.

\* \* \* \* \*